May 27, 1958 J. A. BRILEY 2,836,435
SAFETY JOINT WITH SPLIT CAM SPRING
Filed Jan. 24, 1955
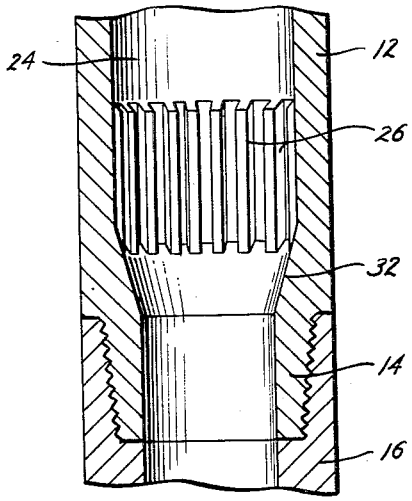
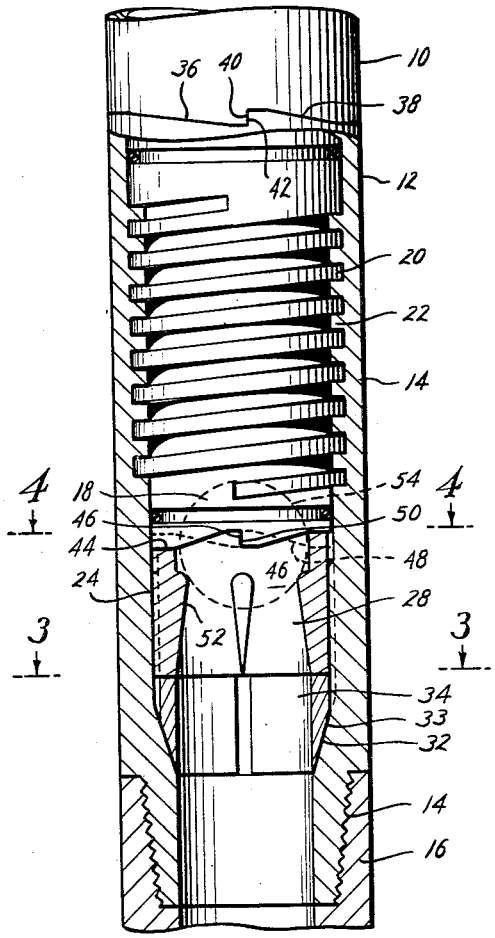
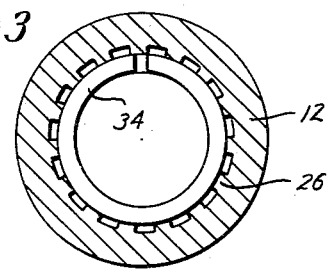
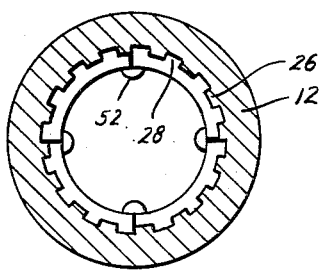
Jesse A. Briley
INVENTOR.
BY James F. Weiler &
Jefferson D. Hiller
ATTORNEYS

United States Patent Office 2,836,435
Patented May 27, 1958

2,836,435

SAFETY JOINT WITH SPLIT CAM SPRING

Jesse A. Briley, Luling, Tex., assignor to Texas Delta Development Corporation, Lockhart, Tex., a corporation of Texas Application January 24, 1955, Serial No. 483,742

7 Claims. (Cl. 285—84)

This invention relates to novel and useful improvements in a coupling and in a safety joint and more particularly relates to a coupling and safety joint which include a locking mechanism which may be released by means of a go-devil, ball, bar drop and the like so that the coupling and safety joint may readily be released.

The present invention constitutes an improvement over prior lockable safety joints, for example, as disclosed in U. S. Patent No. 1,883,071, granted October 18, 1932, on the application of F. Stone. In these safety joints the locking assembly or sleeve is yieldingly held in locked position by a coil spring which is compressed to permit the sleeve to move away from the end of the pin member so that the safety joint can be disconnected. This type safety joint is unsatisfactory and fails to function as intended in many instances where used in a well bore containing fluid such as drilling fluid or one in which drilling fluid is circulated due to fouling of the spring, which spring is exposed to the fluid in the well bore. When the spring is fouled, it cannot be compressed sufficiently to release the locking mechanism and the safety joint cannot be released or unscrewed as intended. This results in a complete failure of the safety joint for the purpose intended, which is a failure to release or disconnect when intended.

The coupling of the present invention is therefore particularly useful as a safety joint in drilling strings, tubing and the like in the drilling, production and maintenance of oil wells and the like, whereby two portions of the drilling string, tubing or other members may securely be locked together for rotation in either direction, but which may readily be released when it is desired to disconnect the two portions of the drilling string, tubing or other members, as for example, when the drilling string becomes stuck, when a packer becomes stuck, in fishing operations to recover stuck drill pipe, drill bits, packers and the like or in other operations particularly where fluid is in the well bore. For the purpose of disclosure, the safety joint is illustrated as forming a connection of the bit to the drill collars in a drill string; however, it will be understood that the safety joints may be interspersed at one or more places in the drill string or drill collars and may be used for many other purposes, such as in tubing or incorporated as an integral part or used with various tools used in the drilling and production of oil, gas, water and like wells as well as other uses.

The principal object of this invention is to provide an improved safety joint or safety coupling and lock whereby a dependable connection may be had between two portions of a drill string, tubing or other elements for rotation in either direction; and whereby this joint or coupling may reliably be released to permit relative rotation between the members so that the drilling string, tubing or other elements may be disconnected by unscrewing the two portions of the safety joint or coupling device.

Yet a further object of the present invention is the provision of a releasably locked safety joint including an improved locking assembly which is efficiently reliable for use in well bores containing fluid or in which fluid is circulated or flowed.

A further object of the invention is to provide a detachable coupling or safety joint which may readily be incorporated into an element of a drilling string, tubing or other tool, which element may be interposed therein as a part thereof and which efficiently and reliably performs its intended function in an improved manner.

A still further object of the invention is to provide a safety joint or detachable coupling in accordance with the foregoing objects whereby during normal operation, the strain or torsion of the rotation of the drilling or other string is carried by a sturdy clutch jaw assembly and is relieved from the coupling threads of the safety joint or detachable coupling.

Yet another object of the invention is to provide an improved safety joint or detachable coupling in accordance with the above-mentioned objects in which release of the safety joint or coupling may be effected by dropping a go-devil, such as a bar or other member, down the drilling string or tubing whereby its weight will engage upon cooperating portions of the locking member of the safety joint or coupling for effectively releasing the same and thereby permitting the safety joint or coupling to be disconnected by relative movement of the detachable sections on reverse or other rotation of the drilling string or tubing.

A still further and important object of the invention is to provide a safety joint or detachable coupling assembly in accordance with the immediately preceding object in which the go-devil or weight member has a snug sliding engagement with the inside of the drilling string or tubing whereby fluid pressure from the circulating mud pumps may be utilized to force the locking member into a released position to permit the detachable sections of the safety joint or coupling to be disconnected.

These together with other objects and advantages which will subsequently become apparent reside in the details of construction and arrangement of parts as more fully hereinafter described and claimed, reference being had to the accompanying drawing forming a part hereof, wherein like numerals refer to like parts throughout, and in which:

Figure 1 is a fragmentary elevational view, partly in section illustrating a releasable safety joint in accordance with the invention;

Figure 2 is a fragmentary view, in sectional elevation, with the locking member omitted, showing the lower portion of the coupling or safety joint;

Figure 3 is a cross-sectional view taken along the line 3—3 of Figure 1 and looking in the direction of the arrows; and Figure 4 is a cross-sectional view taken along the line 4—4 of Figure 1 and looking in the direction of the arrows.

It is well known that in rotary drilling of wells and in the rotation or other manipulation of drilling strings, tool strings, tubing, various tools and the like, a detachable coupling or subassembly, commonly referred to in the art as a safety joint, is interposed in the string of pipe, tubing, tools and the like to permit the tubing or string of pipe or elements in or adjacent the tools to be disconnected at this coupling; for example, in drilling the safety joint preferably is placed adjacent the tool or the drill bit at the lower end of the drilling string to permit the string to be disconnected at this point and thus salvage the upper portion of the same when the lower end of the string becomes stuck for any reason. As mentioned previously, the safety joint may be interspersed in tubing and other drilling or production strings and be included in various tools so that the same may be disconnected at that point if such becomes necessary. It is, however, necessary that such a safety joint or detachable coupling shall be of such construction that it will not inadvertently separate, despite reversals of rotation of the string or other manipulation thereof, until such separation is intended but that the safety joint will be releasable when intended. It is of utmost importance that the fluid in the well bore does not foul the safety joint so that it will not release as this defeats the entire purpose for which the safety joint is intended, that is, provide an efficient joint but one which will release when intended. The present invention provides a coupling or safety joint which will maintain a secure coupling connection between its detachable components despite reversals of direction of rotation of the string or other manipulations or forces until the coupling is positively unlocked and one which is readily releasable and unlocked when intended and not subject to clogging or fouling except, perhaps, in extreme cases.

In the form illustrated in the accompanying drawing, the principles of the invention are incorporated into a safety joint or a back-off sub assembly. Referring now to the drawing the safety joint includes a pair of tubular separable members, one numbered 10 constituting the pin member of the assembly and the other member 12 constituting the box member thereof. The latter member, at its lower end, is provided with an externally-threaded pin 14, for threaded connection with a drill bit or any other desired tool, the upper fragmentary portion 16 thereof being shown. It will be understood the lower portion may comprise an internally-threaded box portion so that it may threadedly receive a pin member, if such is desired.

As will readily be apparent from Figure 1, and referring to this figure, the two component tubular members, the pin member and the box member of the safety joint or back-off sub assembly are provided with a central passage forming a continuation of the drill stem passage whereby drill fluid may be circulated therethrough in the usual manner.

As shown clearly in Figure 1, the pin member 10 is provided with an extension 18 constituting a pin extension, the latter which is provided with an external thread 20 whereby this pin extension may be screw threadedly engaged in the complementary internal thread 22 formed in the wall of the chamber 24 in the upper end of the box member 12 whereby the two components of the safety joint or sub assembly may be detachably coupled together. The walls of the extension and the chamber are straight or tubular so that a minimum of wedging is provided between the threads for the purpose of providing less friction between these threads than other tapered threaded connections of the string of pipe or tool thereby insuring the release of the detachable elements of the safety joint when desired.

As best seen in Figures 2 and 4, in the lower end of the chamber 24, there are provided a plurality of axially-disposed, keying members in the form of splines 26. These splines serve to connect to the box member a lock member 28 which is preferably in the form of a sleeve and is provided with complementary, axially-extending channels or grooves 30 which cooperate with the splines 26. Thus, the sleeve forming the lock member is secured in the chamber of the box member in such a manner that axial sliding movement of the sleeve with respect to the box member is permitted and relative rotation therebetween is prevented.

At this point, it will readily be understood that the splines and groove construction can be reversed, with the splines being carried upon the exterior surface of the sleeve 28, while the grooves may be formed in the walls of the chamber 24 in the box member. It is merely essential that some keying means or interfitting projections and recesses be provided which will permit the desired axial sliding movement of the lock member with respect to the box member but prevent relative rotation therebetween.

The lower end of the chamber 24 is provided with an inwardly tapered shoulder 32 upon which is seated a solid band type compression spring 34 whose upper end engages the bottom surface of the lock member 28 to yieldingly urge the same upwardly in the chamber 24 or toward the lock member 28 for the purpose of releasably locking the lock member 28 with the lower end of the pin extension 18, as will later be apparent. The spring 34 is a solid band which is split in a generally axial direction, although it may be split at an angle to the axis, and does not extend completely circumferentially about the inner wall of the lower portion of the chamber 24. The lower exterior portion of the spring band is tapered similar to that of the shoulder 32 and seats thereon. Thus, a full passage is provided through the spring band for flow of fluid yet the spring band is not subject to fouling by fluid such as would be the case in using an ordinary coil spring in which fluid and contaminants collect between the open spaces of the spring and prevent compression thereof.

As best seen in Figure 1, the lower portion of the pin member 10, from which the extension 18 extends, has an annular shoulder or surface 36 which surrounds the enlarged base portion of the extension. This surface cooperates with the complementary annular surface 38 formed upon the adjacent opposed portion of the box member. Sets of locking clutch jaws or cams 40 extend axially from the annular surface 36 of the pin member and are complementary to and cooperate with corresponding locking clutch jaws or cams 42 upon the upper end of the box member. There is sufficient clearance between the cooperating jaws or cams to permit the double, square or buttress threads 20 and 22 of the pin extension 18 in the box chamber 24 to be threaded into each other and permit the clutch or cam surfaces 40 to abut the clutch or cam surfaces 42. When these surfaces abut, it is obvious that rotation of the drilling string in the direction of engagement thereof will cause the surfaces 40 to transmit the driving torque to the surfaces 42 whereby the pin member will drive the box member directly without this torque being imparted to the coupling threads 20 and 22 thereby preventing any additional wedging of the threads after the joint is fully made up. However, reverse rotation will move the jaws 40 and 42 out of engagement upon relative rotation of the pin and box members, and immediately upon such motion, the threads 20 and 22 will begin to disengage whereby the coupling will readily be disconnected upon such reverse rotation.

In order to insure that the coupling will not inadvertently be separated by reverse rotation causing relative movement between the pin and box members, a detachable lock is provided.

For that purpose, and referring again to Figure 1, the above-mentioned lock member 28 is provided with an annular surface upon its upper end, this surface being indicated by the reference numeral 44, and being provided with a plurality of clutch jaws or abutment or cam surfaces 46. The lower end of the pin extension 18 is likewise provided with an annular surface 48 complementary to the annular surface 44 and also provided with abutment, cams or locking jaws 50 which are complementary to the jaws 46. Preferably, the abutment surfaces or locking jaws 46 and 50 are so disposed that they will lock the pin extension to the locking sleeve and through the connection of the latter with the box member will lock the pin member to the box member in the reverse direction of rotation from the locking action of the jaws 40 and 42 of the surfaces 36 and 38 previously mentioned. Thus, when the locking sleeve is pressed up into engagement with the end of the pin extension, as shown in Figures 2 and 4, the jaws 40 and 42 will lock the two components of the sub assembly or safety joint against relative rotation in one direction, while the jaws 50 and 46 will lock the components against rotation in the other direction. Thus, the two components 10 and 12 are securely locked against relative rotation in either direction of rotation of the drilling string, as long as the locking sleeve 28 is held in its upper or operative position by the compression spring band 34.

In order to release these members, there are provided a plurality of shoulders, abutment surfaces or ribs 52 formed upon the inner surface of the sleeve 28 and projecting into the bore thereof. As best seen in Figure 1, a weight, which may be in the form of a bar, a ball or any other suitable shape, commonly referred to in the art as a go-devil, is dropped down the string of pipe, not shown, until it engages the shoulders 52, whereupon the weight thereof depresses the locking sleeve 28 against the spring band 34, causing the jaws 46 to withdraw from the jaws 50, whereby the components of the safety joint are free to be released upon reverse rotation of the drilling string relative to the box member 12.

Preferably, the go-devil or weight which is dropped through the drilling string in order to release the lock member has a snug sliding fit with the bore through the string, whereby the pressure of the mud pump may be utilized to force the weight downwardly and against the lock member and release the same. Conveniently, as shown in Figure 1, this go-devil or weight may be in the form of a ball 54. This ball may be forced downwardly by the force of the mud pump which circulates the drilling fluid, as indicated by the arrows, until the ball engages the shoulders or projections 52. Then, either under the weight of the ball, or the force of the circulating pump or both, the ball will be forced downwardly, carrying with it the lock member 28 and compressing the spring band 34 radially inwardly and downwardly, thus causing disengagement of the locking connection of the locking jaws 46 of the lock member 28 from the complementary jaws 50 of the pin extension 18, as indicated in dotted lines in Figure 1.

When the lock has been disengaged, the driller can readily separate the two components of the back-off sub by reverse rotation of the drilling string, as above mentioned, in the event the string of pipe therebelow resists rotation more than the wedging action or friction of the threads 20 and 22, which is insured due to the straight or tubular wall of the pin and box members and the engagement of the clutches 36 and 38 limiting the amount of wedging of the buttress threads 20 and 22.

In the back-off sub or coupling assembly herein set forth, it is obvious that the same may easily be installed in any desired portion of a drilling or tubing string as well as various tools, and that when the pin member is screwed into the box member, the lock member will automatically couple the same together until released as above mentioned. When the drill or tubing string or tool is being removed from the well bore, during a normal trip in the well, the lock member may be released by inserting a member through the lowermost section of the drill or tubing string or tool thereabove for depressing and releasing the lock member.

The spring band is particularly advantageous in that there is very little likelihood of the spring band being clogged or fouled due to drilling mud and contaminants therein, as well as other fluids, circulating through the safety joint.

Numerous modifications and changes may be made in the safety joint or coupling which are within the spirit of the invention and the scope of the appended claims. For example, for certain uses it may be desirable to eliminate the jaws 40 and 42. Also, numerous uses of safety joints or back-off subs constructed according to the invention will suggest themselves to those skilled in the art. For example, and as previously mentioned, in addition to use in drilling strings, tubing and other strings of pipe used in well bores, the safety joint may be incorporated as a part of, made integral with or used in connection with various tools, particularly fishing tools and the like used in recovering fish or lost or stuck objects in well bores.

The present invention therefore is well suited and adapted to carry out the objects and attain the ends and advantages set forth as well as others inherent therein and from the foregoing, the construction and operation of the device will readily be understood and further explanation is believed to be unnecessary. While only one example of the invention has been given for the purpose of the disclosure, the invention is not to be limited to the exact construction shown and described since numerous modifications and changes will readily occur to those skilled in the art. Accordingly, all suitable modifications and equivalents may be resorted to, falling within the scope of the appended claims.

What is claimed is:

1. A coupling comprising a tubular box member, a tubular pin member, a tubular extension on the pin member received by the box member when the joint is made up, interengaging threads on the box and extension, a lock member, means securing said lock member in the inner end of said box member and against rotation relative thereto but for axial sliding movement therein, said extension of the pin and said lock member having engaging surfaces provided with engaging jaws preventing relative rotation of the extension and box member in a direction for disconnecting the safety joint, a spring band disposed about an inner wall of the inner end of the box member and provided with a generally-axially-extending divided portion, an inwardly tapered seat disposed in the inner end of the box member, said spring band seating on said seat and bearing against the lock member, and lock operating means on the lock member engageable by means movable through the pin member for moving the lock member away from the extension and out of locking engagement therewith.

2. The coupling of claim 1 where the means securing said lock member in the inner end of the box member comprise axially-extending, interfitting projections and recesses on the lock member and in the box member.

3. The coupling of claim 1 where the lock operating means on the lock member comprises inwardly-projecting abutments engageable by said means movable through the pin member.

4. A safety joint comprising a tubular box member, a tubular pin member, an extension on the pin member adapted to be received by the box member when the joint is made up, interengaging threads on the box and pin member, engaging shoulders on the box and pin members provided with engaging jaws when the joint is made up limiting relative rotation of the pin member and box member in the direction of making up the joint, a lock member, means securing the lock member in the inner end of said box member and against rotation relative thereto but for axial sliding movement therein, said extension of the pin and said lock member having engaging surfaces provided with engaging jaws preventing relative rotation of the extension and box member in a direction opposite to the first-mentioned direction for preventing disconnection of the safety joint, a tapered seat in the inner end of said box member, a spring band seating on the seat and bearing against the lock member, said spring band provided with a complementary seat and a generally-axially disposed divided portion yieldingly urging said lock member toward the engaging surfaces of the extension and the lock member, and lock operating means on the lock member engageable by means movable through the pin member for moving the lock member away from the extension and out of locking engagement therewith.

5. A safety joint comprising, a tubular box member, a tubular pin member, an extension on the pin member adapted to be received by the box member when the joint is made up, said extension and box member having axially-extending walls, interengaging threads on the box member and extension, annular mating shoulders on said box and pin members provided with cooperating jaws when the joint is made up limiting relative rotation of said box and pin members in the direction of making up the joint, a locking sleeve, interfitting and axially-extending splines and grooves on said lock member and in the inner end of said box member for preventing relative rotation but permitting axial sliding movement of the lock sleeve in the box member, said extension of the pin and said lock sleeve having annular engaging surfaces provided with engaging jaws preventing relative rotation of the extension and box member in a direction opposite to that first-mentioned for preventing disconnection of the safety joint, a spring band having a divided portion disposed between and engaging the inner end of the box member and locking sleeve yieldingly urging said locking sleeve toward the engaging surface of the extension, and abutment surfaces on said sleeve for engagement with means movable through the pin member for moving said locking member away from the pin member extension and out of locking engagement therewith.

6. The safety joint of claim 5 where the movable means has a snug sliding fit with the bore of the pin member whereby pressure of drilling fluid will be effective to forcibly press the movable means against the lock member to thereby release the same.

7. In a coupling having a tubular box member, a tubular pin member, a tubular extension on the pin member received by the box member when the joint is made up, interengaging threads on the box and extension, a lock member, means securing said lock member in the inner end of said box member and against rotation relative thereto but for axial sliding movement therein, said extension of the pin and lock member having engaging means preventing relative rotation of the extension and box member in a direction for disconnecting the safety joint and lock operating means on the lock member engageable with means movable through the pin member for moving said lock member away from the extension and out of locking engagement therewith, the improvement comprising a spring band having a generally axially divided portion disposed between and engaging the inner end of the box member and lock member yieldingly urging said lock member toward the extension, and an inwardly tapered seat disposing in the inner end of the box member, said spring band seating on said seat.

References Cited in the file of this patent
UNITED STATES PATENTS

| | | |
|---|---|---|
| 1,883,071 | Stone | Oct. 18, 1932 |

FOREIGN PATENTS

| | | |
|---|---|---|
| 424,711 | Germany | Dec. 2, 1922 |
| 342,557 | Great Britain | Feb. 5, 1931 |